US012792276B2

(12) United States Patent
Tamborski et al.

(10) Patent No.: US 12,792,276 B2
(45) Date of Patent: Nov. 10, 2026

(54) PROCESSING NAMESPACE RANGE INFORMATION BY A GLOBAL COORDINATOR

(71) Applicant: International Business Machines Corporation, Armonk, NY (US)

(72) Inventors: Patrick Aaron Tamborski, Chicago, IL (US); Stephen Garward, Grayslake, IL (US); Shikha Shree, Chicago, IL (US); Asimuddin Kazi, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/938,523

(22) Filed: Nov. 6, 2024

(65) Prior Publication Data

US 2026/0126936 A1 May 7, 2026

(51) Int. Cl.
*G06F 3/06* (2006.01)

(52) U.S. Cl.
CPC ............ *G06F 3/067* (2013.01); *G06F 3/0604* (2013.01); *G06F 3/0644* (2013.01); *G06F 3/0653* (2013.01); *G06F 3/0665* (2013.01)

(58) Field of Classification Search
None
See application file for complete search history.

(56) References Cited

U.S. PATENT DOCUMENTS 5,761,411 A 6/1998 Teague et al.
7,584,219 B2 9/2009 Zybura et al.
7,987,167 B1 7/2011 Kazar et al.
8,108,483 B2 1/2012 Aust et al.
8,151,352 B1 4/2012 Novitchi
8,447,780 B1 5/2013 Plantenberg et al.
9,142,322 B2 9/2015 Baranwal et al.
9,171,160 B2 10/2015 Vincent et al.
(Continued)

OTHER PUBLICATIONS

Rohit Rahi. "Object Storage." Oct. 2019. https://www.oracle.com/a/ocom/docs/cloud/object-storage-100.pdf.*
(Continued)

*Primary Examiner* — Nathan Sadler
(74) *Attorney, Agent, or Firm* — Cantor Colburn LLP; Monchai Chuaychoo

(57) ABSTRACT

A method includes receiving, at a global coordinator from a first management device, first namespace information for each of a first plurality of storage devices, the first namespace information being shared among the first plurality of storage devices. The method further includes receiving, at the global coordinator from a second management device, second namespace information for each of a second plurality of storage devices, the second namespace information being shared among the second plurality of storage devices. The method further includes identifying a similar characteristic across the first plurality of storage devices and the second plurality of storage devices. The method further includes generating a task to be performed by at least one of the first management device or the second management device based on the similar characteristic. The method further includes causing at least one of the first management device or the second management device to perform the task.

20 Claims, 5 Drawing Sheets

(56) References Cited

U.S. PATENT DOCUMENTS

| | | | | |
|---|---|---|---|---|
| 9,535,774 | B2 | 1/2017 | Cher et al. | |
| 9,686,293 | B2 | 6/2017 | Golshan et al. | |
| 10,275,361 | B2 | 4/2019 | Ish et al. | |
| 10,884,648 | B2 | 1/2021 | Guo et al. | |
| 10,891,068 | B2 | 1/2021 | Guo et al. | |
| 11,226,860 | B1 | 1/2022 | Baptist et al. | |
| 11,314,442 | B2 | 4/2022 | Kazi et al. | |
| 11,412,041 | B2 | 8/2022 | Tamborski et al. | |
| 11,588,892 | B1 | 2/2023 | Khadiwala et al. | |
| 11,973,823 | B1 | 4/2024 | Ghorpade et al. | |
| 2007/0006048 | A1 | 1/2007 | Zimmer et al. | |
| 2011/0145838 | A1 | 6/2011 | De et al. | |
| 2013/0326284 | A1 | 12/2013 | Losh et al. | |
| 2014/0032962 | A1 | 1/2014 | Deshpande | |
| 2015/0074469 | A1 | 3/2015 | Cher et al. | |
| 2015/0127919 | A1 | 5/2015 | Baldwin et al. | |
| 2015/0243373 | A1 | 8/2015 | Chun et al. | |
| 2016/0019983 | A1 | 1/2016 | Chung | |
| 2016/0072889 | A1 | 3/2016 | Jung et al. | |
| 2017/0004309 | A1 | 1/2017 | Pavlyushchik et al. | |
| 2017/0031959 | A1 | 2/2017 | Zayas et al. | |
| 2017/0090824 | A1 | 3/2017 | Tamborski | |
| 2017/0093978 | A1 | 3/2017 | Cilfone et al. | |
| 2018/0025025 | A1 | 1/2018 | Davis et al. | |
| 2018/0239697 | A1 | 8/2018 | Huang et al. | |
| 2018/0314441 | A1 | 11/2018 | Suryanarayana et al. | |
| 2019/0065524 | A1 | 2/2019 | Johnson et al. | |
| 2019/0146675 | A1* | 5/2019 | Subramanian | G06F 3/06 711/170 |
| 2019/0146907 | A1 | 5/2019 | Frolikov | |
| 2019/0188589 | A1 | 6/2019 | Ponnuru et al. | |
| 2019/0278498 | A1* | 9/2019 | Dedrick | G06F 3/0653 |
| 2019/0281114 | A1 | 9/2019 | Cocagne | |
| 2019/0394272 | A1 | 12/2019 | Tamborski et al. | |
| 2020/0019447 | A1* | 1/2020 | Tamborski | G06F 9/542 |
| 2020/0050365 | A1* | 2/2020 | Tamborski | G06F 3/067 |
| 2020/0104056 | A1* | 4/2020 | Benisty | G06F 3/0688 |
| 2020/0183840 | A1 | 6/2020 | Johns et al. | |
| 2020/0192799 | A1 | 6/2020 | Johns et al. | |
| 2020/0278896 | A1 | 9/2020 | Kumari et al. | |
| 2020/0409559 | A1* | 12/2020 | Sharon | G06F 3/064 |
| 2021/0173582 | A1 | 6/2021 | Kazi et al. | |
| 2021/0216227 | A1 | 7/2021 | Kazi et al. | |
| 2021/0349782 | A1* | 11/2021 | Ki | G06F 11/165 |
| 2021/0367834 | A1 | 11/2021 | Palavalli et al. | |
| 2022/0236916 | A1* | 7/2022 | Esaka | G06F 3/0604 |
| 2023/0195577 | A1* | 6/2023 | Darnell | G06F 11/2048 714/15 |
| 2023/0401120 | A1 | 12/2023 | Gim et al. | |
| 2024/0220227 | A1 | 7/2024 | Kerr et al. | |
| 2024/0361939 | A1 | 10/2024 | Brown et al. | |
| 2024/0377948 | A1 | 11/2024 | Zhang et al. | |
| 2025/0077475 | A1 | 3/2025 | Qi et al. | |

OTHER PUBLICATIONS

SNIA. The SNIA Dictionary. Mar. 2022. https://www.snia.org/sites/default/files/dictionary/SNIADictionary.pdf. p. 179.*

Authors et al.: Disclosed Without Attribution, IP.com No. IPCOM000252417D, "Method and System for Classifying Memory Devices and Slices to Create Optimal Storage Decisions in Distributed Storage Network (DSN)", Jan. 9, 2018, 3 pages.

Authors et al.: Disclosed Without Attribution, IP.com No. IPCOM000263306D, "Dispersed Storage Namespace Health Based Device Prioritization and Recovery Algorithm", Aug. 17, 2020, 7 pages.

Authors et al.: Disclosed Without Attribution, IP.com No. IPCOM000263385D, "Methodology of Hinting the NVME Host about the NVME Queues Optimized for NVME Namespace Operation", Aug. 26, 2020, 7 pages.

Authors et al.: Seagate Technology, LLC, IP.com No. IPCOM000268073D, "Staged NVMe in a Primary/Secondary Relationship", Dec. 21, 2021, 4 pages.

Han et al. "ZNS+: Advanced Zoned Namespace Interface for Supporting In-Storage Zone Compaction", Proceedings of the 15th USENIX Symposium on Operating Systems Design and Implementation, Jul. 14-16, 2021, 17 pages.

Kazi, et al. "Namespace Range-Based Memory Device Compaction," U.S. Appl. No. 19/078,385, filed Mar. 13, 2025, 29 pages.

Kazi, et al. "Proactive Operating System Memory Unit Replacement Based on Namespace Health," U.S. Appl. No. 18/938,516, filed Nov. 6, 2024, 24 pages.

Kazi, et al. "Upgrade Orchestration of a Storage System Based on Namespace Range Gaps," U.S. Appl. No. 18/938,502, filed Nov. 6, 2024, 40 pages.

Min et al. "eZNS: Elastic Zoned Namespace for Enhanced Performance Isolation and Device Utilization", ACM Transactions on Storage, Jun. 6, 2024, pp. 1-41, vol. 20, Issue 3.

Tamborski, et al. "Identifying and Visualizing Namespace Range Gaps," U.S. Appl. No. 18/938,511, filed Nov. 6, 2024, 41 pages.

Wang David. "Application Optimization with Flexible Zone Namespace Configurations in QLC-Based SSDs", Silicon Motion, 2023, 16 pages.

United States Non-Final Rejection dated Oct. 2, 2025, 38 pages, in U.S. Appl. No. 18/938,516.

"Intel® Optane™ DC SSD Series", Intel, Feb. 2012, 27 pages, https://ark.intel.com/content/www/us/en/ark/products/series/213706/intel-optane-dc-ssd-series.html.

"Intel® Solid-State Drive 520 Series", Intel, Sep. 9, 2024, 5 pages, https://www.intel.com/content/dam/www/public/us/en/documents/product-specifications/ssd-520-specification.pdf.

"Smart Attribute Details", Kingston, 2015, 9 pages, https://media.kingston.com/support/downloads/MKP_306_SMART_attribute.pdf.

"SSD Failures: Common Causes And Main Bad Symptoms", Multicloud backup Solutions, Oct. 27, 2020, 9 pages, https://www.salvagedata.com/ssd-failures-common-causes-and-main-symptom/.

"Tabular Classification", Hugging Face, retrieved from web dated Dec. 20, 2024, 4 pages.

"What is supervised learning?", IBM, retrieved from web dated Dec. 20, 2024, 9 pages.

Diamantopoulos et al. "WannaLaugh: A Configurable Ransomware Emulator—Learning to Mimic Malicious Storage Traces", arXiv:2403.07540v2 [cs.CR], Jun. 12, 2024, 22 pages, https://arxiv.org/abs/2403.07540v1#.

Gagulic et al. "Ransomware Detection with Machine Learning in Storage Systems", University of Zurich Department of Informatics (IFI) Binzmühlestrasse 14, CH-8050 Zurich, Switzerland, Feb. 13, 2023, 114 pages, https://files.ifi.uzh.ch/CSG/staff/vonderassen/extern/theses/map-gagulic-zumtaugwald-sahu.pdf.

Kruegel Christopher. "Full System Emulation: Achieving Successful Automated Dynamic Analysis of Evasive Malware", Lastline, 2014, 7 pages.

Rout Sidhartha Sankar. "Reliability Aware Intelligent Memory Management (RAIMM)", Indraprastha Institute of Information Technology Delhi, New Delhi, 2014, 54 pages, https://repository.iiitd.edu.in/jspui/handle/123456789/146.

Sharma Natasha. "K-Means Clustering Explained", Neptune Blog, Apr. 15, 2024, 25 pages.

Sharma Pulkit. "An Introduction to K-Means Clustering", Machine Learning, Dec. 18, 2024, 43 pages.

Taylor et al. "Sensor-based Ransomware Detection", Future Technologies Conference (FTC), Nov. 29-30, 2017, 8 pages, https://s2.smu.edu/~mitch/ftp_dir/pubs/ftc17.pdf.

Wijaya Cornellius Yudha. "LLMs Implementation for Tabular Classifications", Trying out ML Tabular Classification Task with LLM, Nov. 16, 2023, 9 pages.

Zhang et al. "Towards Foundation Models for Learning on Tabular Data", arXiv:2310.07338 [cs.LG], Oct. 11, 2023, 22 pages.

Lucia Theo. "An Ultimate Guide to Hard Drive Problems, Solutions and Tips", The Wayback Machine, Jan. 13, 2021, 25 pages, retrieved from https://web.archive.org/web/20210120063626/https://recoverit.wondershare.com/computer-problem/common-hard-drive-problems-and-solution.html.

United States Non-Final Rejection dated Dec. 17, 2025, 33 pages, in U.S. Appl. No. 18/938,511.

(56) References Cited

OTHER PUBLICATIONS

United States Non-Final Rejection dated Feb. 9, 2026, 45 pages, in U.S. Appl. No. 18/938,502.
United States Notice of Allowance dated Apr. 27, 2026, 48 pages, in U.S. Appl. No. 19/078,385.
United States Notice of Allowance dated Mar. 10, 2026, 17 pages, in U.S. Appl. No. 18/938,511.

* cited by examiner

PROCESSING NAMESPACE RANGE INFORMATION BY A GLOBAL COORDINATOR

BACKGROUND

The present disclosure relates to computing environments, and more specifically, to processing namespace range information by a global coordinator.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computing device may effectively extend its CPU by using "cloud computing" to perform one or more computing functions (e.g., a service, an application, an algorithm, an arithmetic logic function, etc.) on behalf of the computing device. Further, for large services, applications, and/or functions, cloud computing may be performed by multiple cloud computing resources in a distributed manner to improve the response time for completion of the service, application, and/or function. For example, Hadoop is an open-source software framework that supports distributed applications, enabling application execution by hundreds or thousands of computers.

In addition to cloud computing, a computing device may use "cloud storage" as part of its memory system. Cloud storage enables a user, via its computing device, to store files, applications, etc., on an Internet-based storage system. The Internet-based storage system may include a RAID (redundant array of independent disks) system and/or a dispersed storage system that uses an error correction scheme to encode data for storage.

SUMMARY

According to an embodiment, a computer-implemented method for identifying and visualizing namespace range gaps is provided. The method includes receiving, at a global coordinator from a first management device, first namespace information for each of a first plurality of storage devices managed by the first management device, the first namespace information being shared among the first plurality of storage devices. The method further includes receiving, at the global coordinator from a second management device, second namespace information for each of a second plurality of storage devices managed by the second management device, the second namespace information being shared among the second plurality of storage devices. The method further includes identifying a similar characteristic across the first plurality of storage devices and the second plurality of storage devices. The method further includes generating a task to be performed by at least one of the first management device or the second management device based on the similar characteristic. The method further includes causing at least one of the first management device or the second management device to perform the task.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

DETAILED DESCRIPTION

Figure 1:
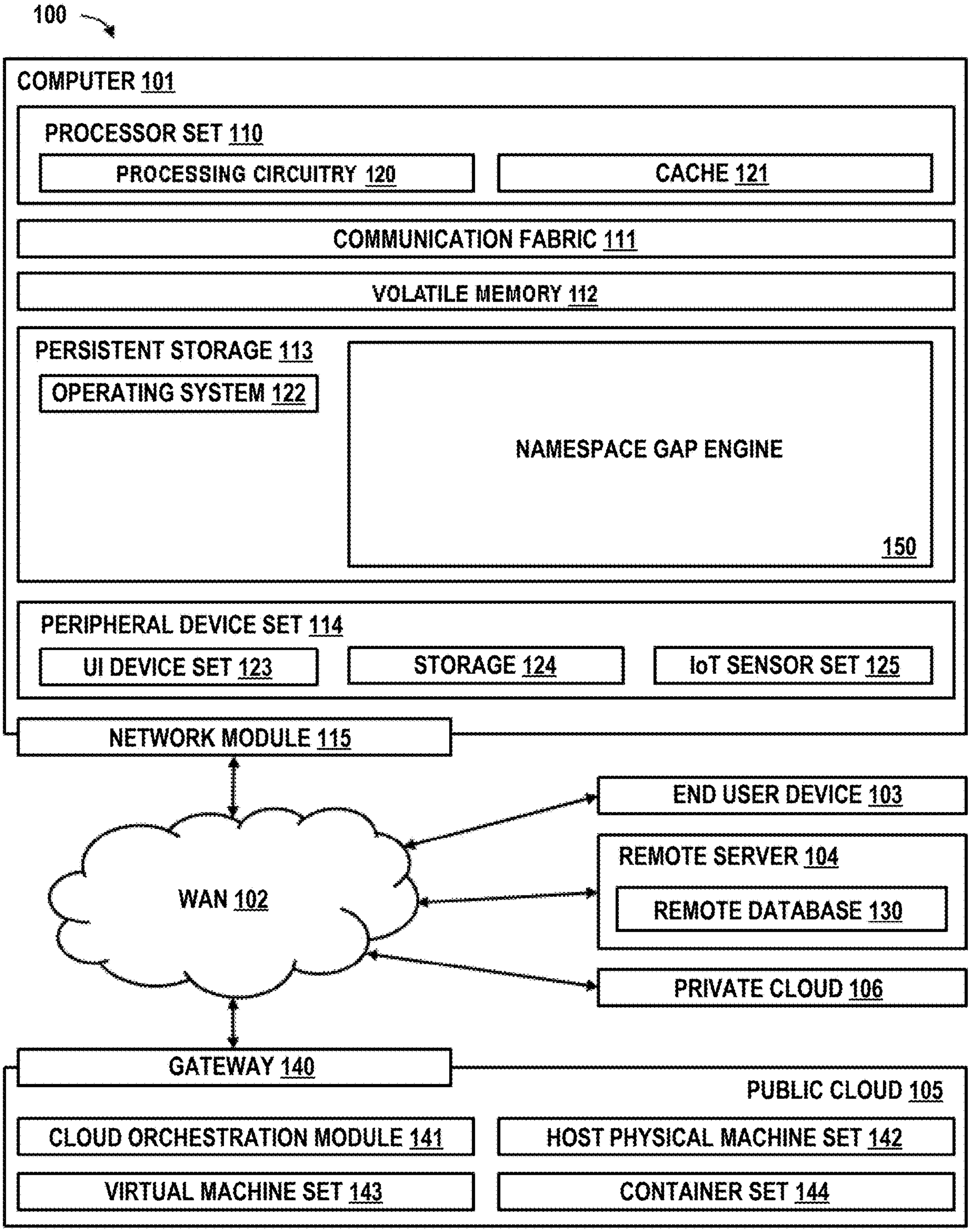
FIG. 1 illustrates a block diagram of a computing environment, according to an embodiment.

One or more embodiments described herein provide for processing namespace range information by a global coordinator.

Storage systems refer to the various methods and technologies used to save, manage, and retrieve data. They encompass a range of solutions, from traditional hard disk drives (HDDs) and solid-state drives (SSDs) to advanced cloud-based and network-attached storage (NAS) systems. These systems are useful for both individuals and organizations to securely store and access data efficiently. Storage systems can be classified into primary storage, which includes high-speed devices for quick access, and secondary storage, which provides larger capacity and longer-term data retention. Advanced storage solutions also utilize technologies like RAID configurations, distributed storage, and object storage, which enhance data redundancy, reliability, and scalability. Modern systems often integrate with cloud infrastructure, providing versatile options for backup, disaster recovery, and data synchronization across multiple locations.

In a storage system, a namespace provides a structured way to organize and manage data by assigning a unique identifier to each data element or object. This allows for easy retrieval and categorization, similar to how file paths work in a filesystem. A namespace ensures that data within the system can be accessed without ambiguity, as each item has a distinct identifier. In distributed and cloud storage systems, namespaces are useful for managing data across multiple storage nodes and locations, enabling seamless scaling and access control. By abstracting data storage from physical devices, namespaces also facilitate features, such as data deduplication, versioning, and metadata management, making it easier to implement policies for data lifecycle, security, and compliance.

Gaps in namespaces can occur when data objects are assigned identifiers non-sequentially or when objects are deleted, leading to unused identifiers. These gaps may complicate data management and reduce storage efficiency, particularly in systems relying on sequential access or storage optimization based on data locality.

One attempt to address gaps in namespaces is to use coarse-grained monitoring and management. However, this approach focuses more on device and drive health but does not reflect the impact on the overall namespace. In some cases, unreliable systems with poor information dispersal algorithms (IDA) require frequent support for namespace health. Customers (e.g., users) often lack knowledge about safe maintenance periods for data storage units, risking data loss due to inappropriate handling. Identifying gaps in a namespace is labor-intensive and inefficient. Significant gaps can threaten storage system availability and current approaches to identifying gaps in namespaces lack prompt and sufficient notifications for proactive risk mitigation.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a namespace gap engine 150 for generating parameters for statistical timing analysis of a circuit. In addition to the namespace gap engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the namespace gap engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the namespace gap engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the namespace gap engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
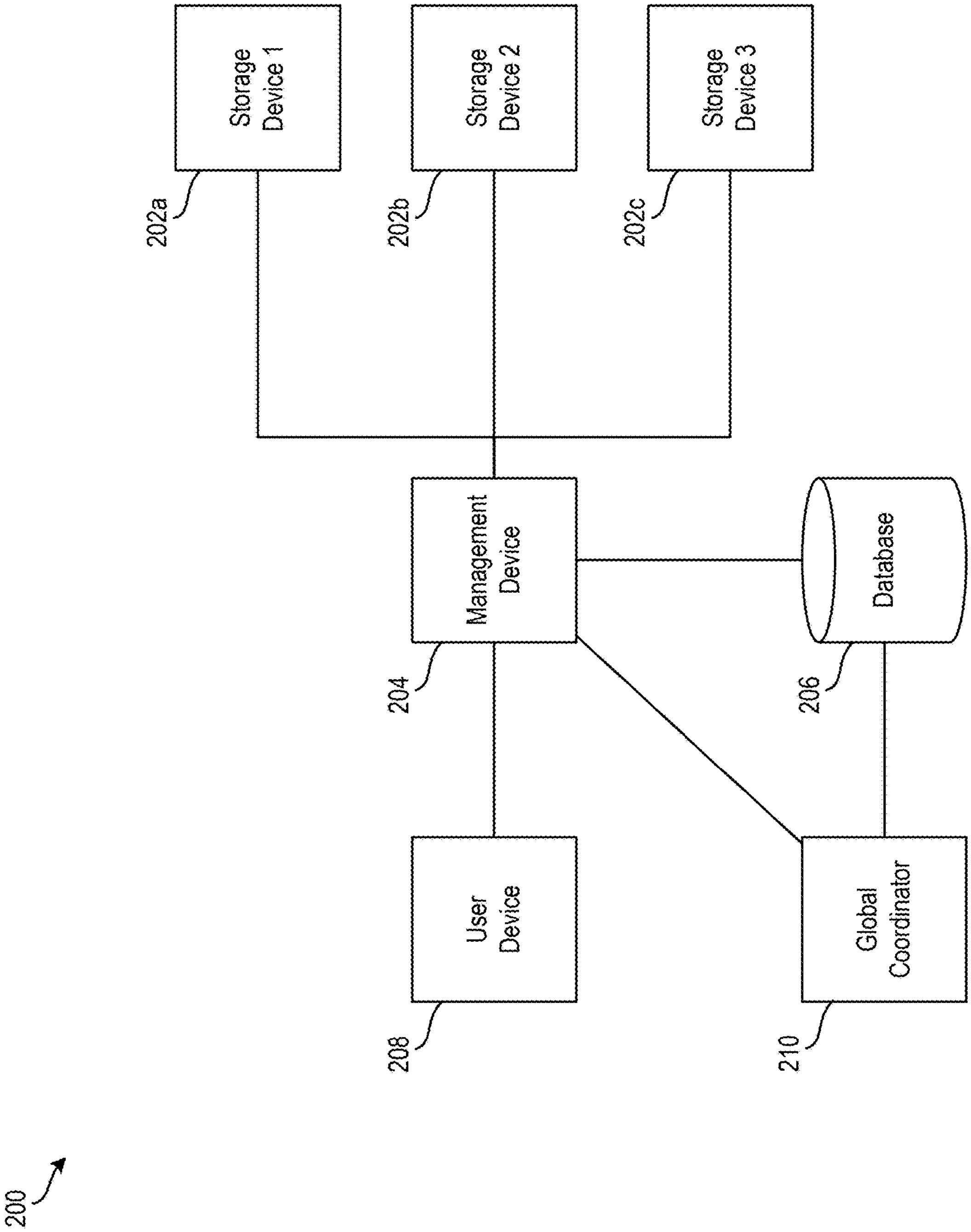
FIG. 2 schematically illustrates a block diagram of a storage system having a management device communicatively coupled to a global coordinator, according to an embodiment.

FIG. 2 illustrates a block diagram of a storage system 200 for identifying and visualizing namespace range gaps, according to an embodiment. The storage system 200 is an example of a data storage network (DSN).

The storage system 200 can be implemented by any suitable computing system, device, or environment, such as those described herein. The storage system 200 includes multiple storage devices, including storage device 1 202*a*, storage device 2 202*b*, and storage device 3 202*c* (collectively referred to as "storage devices 202" and also referred to as "storage units"). Although three storage devices are shown, other numbers (e.g., fewer or greater) of storage devices can be implemented in other embodiments. The storage devices 202 are communicatively connected to a management device 204 for managing aspects of the storage devices 202. The management device 204 is also communicatively connected to a database 206, which stores information about the storage devices 202, such as information about namespace range gaps, as well as other suitable information. The management device 204 can notify a user via user device 208 of any namespace range gaps and/or other suitable information. The user device 208 can be any suitable system or device, such as a laptop computer, desktop computer, virtual computer environment, smartphone, tablet computer, wearable computing device, and/or the like, including combinations and/or multiples thereof.

With continued reference to FIG. 2, the management device 204 oversees distributed data storage by setting parameters for the storage devices 202. Such parameters can be used for vault creation, storage, security, etc. The management device 204 coordinates the creation of a vault (e.g., a virtual memory block associated with a portion of an overall namespace of the storage devices 202) within the memory of the storage devices 202. The management device 204 generates a slice name (SN) for each of the encoded data slices of the storage devices 202. The slice name includes pillar number of the encoded data slice, a data segment number, a vault identifier, which serves as a DSN address for storage and retrieval, and/or the like, including combinations and/or multiples thereof.

Data storage units (e.g., the storage devices 202) are assigned memory devices to store and retrieve slices, aiming to balance storage availability. The management device 204 assigns DSN address ranges to storage units (e.g., the storage devices 202) and generates resource assignment information, including dispersal parameters, storage unit identifiers, addressing details, and/or the like, including combinations and/or multiples thereof. This information is distributed to the storage devices 202 to initialize their use for storing encoded data slices. To recover data segments, a decode threshold number of encoded data slices is required to recover the data segment, and a write threshold number of encoded data slices is needed for a successful write operation recovery. Each of the storage devices 202, with its processor and memory, provides resource availability information to the management device 204, receives resource assignment information, and selects memory devices for the new DSN memory based on this information.

One or more embodiments described herein provide for detecting and alert users about holes or gaps within a namespace range that may not be apparent through existing management applications. One or more embodiments provide timely notifications and actionable insights to proactively address issues, leading to healthier and more robust data storage units (e.g., storage devices 202). One or more embodiments aims to simplify and enhance namespace health support, making it more scalable, efficient, and user-friendly.

Figure 3:
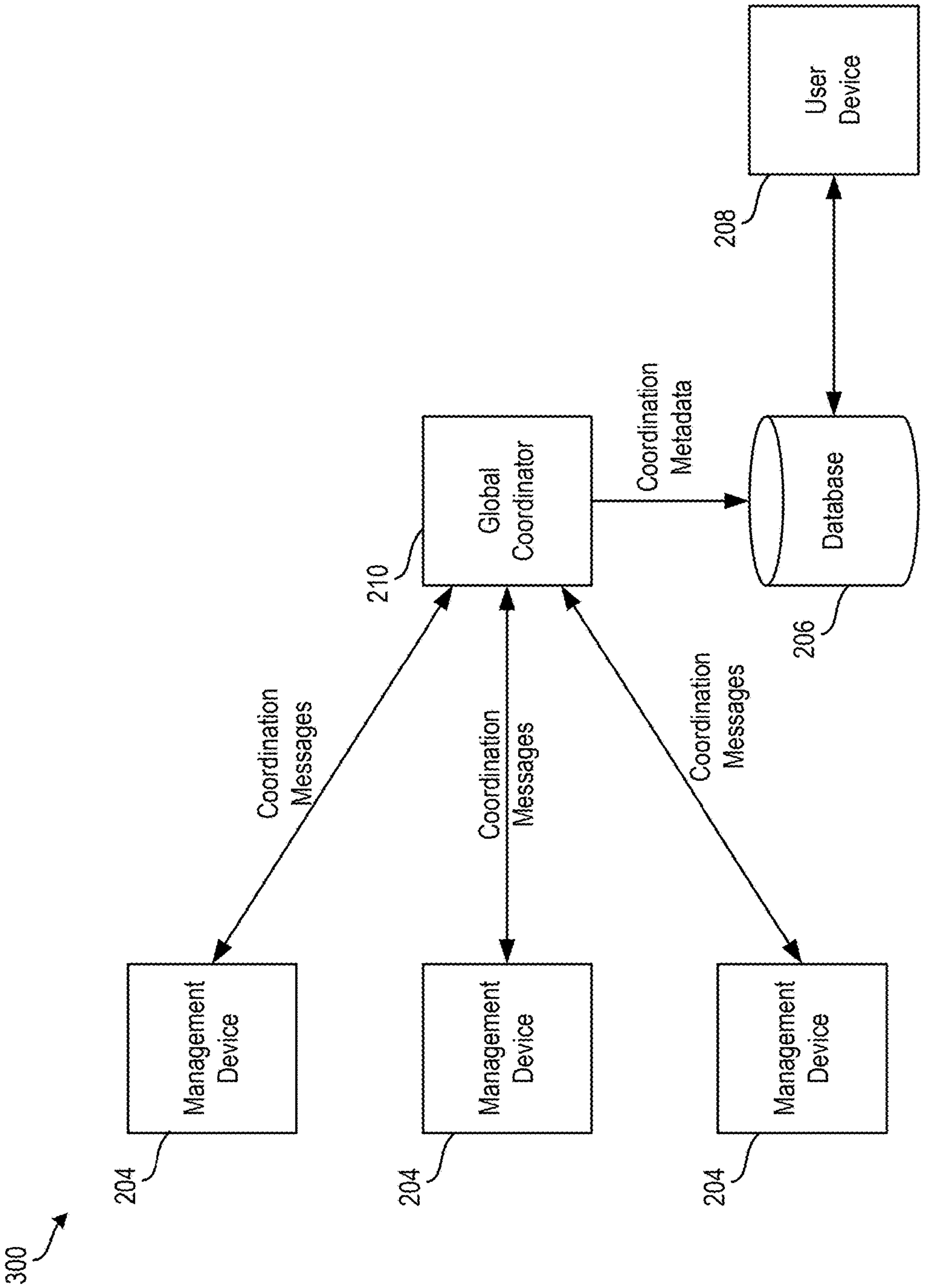
FIG. 3 schematically illustrates a block diagram of a system having a global coordinator communicatively coupled to a plurality of management devices for managing storage systems, according to an embodiment.

According to one or more embodiments, a DSN, such as the storage system 200, includes multiple distributed computing systems including DSN memories. The DSN memories include distributed storage and task processing network managing units referred to as management devices, such as management device 204. The management device 204 initiates connections with a global coordinator 210 that is part of the DSN by periodically exchanging messages/information with the global coordinator 210. The global coordinator 210 transmits a coordination message to the management device 204 that initiates a connection. The management device 204 processes the coordination message, in some cases assisting in execution of tasks indicated in the coordination message, and transmits a response to the global coordinator 210. The global coordinator 210 makes the responses from the management device 204 available for use by other applications and/or available to a user via a user device 208. According to one or more embodiments, the global coordinator 210 can be connected to multiple management devices, such as shown in FIG. 3. The global coordinator 210 can, as part of the coordination message, collect metadata that describes a view of the state of the management device 204 and/or storage devices associated with the management device 204. The state of the management device 204 may include elements, such as network health, process health, device health, etc. According to one or more embodiments, the global coordinator 210 can include an analytics agent that can process metadata and/or identify problems based on a compiled knowledge base. The global coordinator 210 can be any suitable system or device for performing the functions described herein. According to one or more embodiments, the global coordinator 210 is an example of the computer 101.

According to one or more embodiments, the global coordinator 210 receives namespace range information and other metadata about the storage devices 202 from the management device 204. A namespace range can include exemplars to identify requests, such as defining metric exemplars for traces. A namespace range gap affects the health of storage units, and a shrinking gap metric can be linked to rebuilder. One or more embodiments described herein not only helps identify namespace gaps but also provides a clearer understanding of how specific namespaces are affected by bad drives. The management device 204 can take actions, such as informing operators, creating alerts about speed, order, remediation, action plans, and execution plans based on namespace information. More particularly, the namespace range information and other metadata can be leveraged by the global coordinator 210 to construct tasks to be managed and/or implemented by the management device 204.

With continued reference to FIG. 2, the management device 204 exposes a new metric that publishes the actual NSR gaps identified across disks on one or more of the storage devices 202. According to one or more embodiments, one or more of the storage devices 202 can publish the active namespace ranges, which allows another of the storage devices 202 derive the inverse and calculate the NSR gaps. The management device 204 organizes the NSR gap information from each of the storage devices 202 and persists this information in a file (e.g., in the database 206), with fields, such as drive identifier, vault identifier, pillar index, storage type, minimum range, maximum range, and/or the like, including combinations and/or multiples thereof. The global coordinator 210 can receive the namespace range information and/or other metadata (e.g., drive identifier, vault identifier, pillar index, storage type, minimum range, maximum range, and/or the like, including combinations and/or multiples thereof) directly or indirectly from the management device 204 and/or from the database 206.

The information (e.g., metadata) stored in the database 206 can be aggregated in memory to generate alerts or incidents for the user associated with the user device 208. According to one or more embodiments, incidents are generated on a per-stripe basis whenever a NSR gap is identified in a portion of the namespace, with each incident indicating the worst hole in a stripe across all storage types. Alerts can be decomposed into multiple levels, such as per vault, per storage type, and per stripe, from highest to lowest level. Alerting can also be customized based on logical units, and an advanced configuration mechanism will allow alerts to be turned off if necessary.

Additionally, the information stored in the database 206 can impact the health of one or more of the storage devices 202. The shrinking gaps can be associated with rebuilder agents, functions, etc. The information stored in the database 206 can also be used such that the system can also track the age of a hole in a storage unit. Different managing units can act by informing users through alerts, which include details about speed, order, corrective actions, execution plans, and/or the like, including combinations and/or multiples thereof. This comprehensive approach ensures that namespace gap data is effectively utilized to derive actionable results, generate alerts, and manage the health and performance of storage units.

Using the global coordinator 210 to receive and process namespace range information from multiple management devices 204 for multiple storage systems (e.g., the storage system 200) is advantageous because the namespace range information used to feed the analytics agent of the global coordinator 210 can come from multiple distinct storage systems. In addition, the global coordinator 210 can publish namespace range information that is collected for human inspection. This data can then be leveraged to further improve workloads, implement different drives for an on-premise solution, switch cloud platforms, and/or the like, including combinations and/or multiples thereof, thereby improving the performance of one or more storage systems (e.g., the storage system 200).

FIG. 3 schematically illustrates a block diagram of a system 300 having a global coordinator 210 communicatively coupled to multiple of the management devices 204 for managing storage systems (e.g., the storage system 200), according to an embodiment. In this example, the global coordinator 210 exchanges coordination messages with each of the management devices 204. The coordination messages provide for the global coordinator 210 to receive information from the management devices 204, such information including, for example, namespace range information and/or other metadata (e.g., drive identifier, vault identifier, pillar index, storage type, minimum range, maximum range, and/or the like, including combinations and/or multiples thereof). The coordination messages also provide for the global coordinator 210 to transmits messages with tasks/commands to the management devices 204. The global coordinator can store coordination metadata, such as the namespace range information and/or other metadata, in the database 206 or other suitable datastore, which can also be accessed by a user via the user device 208. According to one or more embodiments, the global coordinator 210 stores namespace range information for each of the management devices 204 that is reporting to the global coordinator 210. According to one or more embodiments, the namespace range information includes a pre-aggregated view of the DSN such that the namespace range information is defined coarsely (e.g., at the vault level) and/or finely (e.g., at the storage type level per stripe). The level of granularity can vary in different embodiments.

Embodiments and features of the global coordinator 210 are now described in more detail. The global coordinator 210 can construct an "aggregate of aggregated views" by inspecting the namespace range information for each of the management devices 204 that communicate with the global coordinator 210. As a result, a "global namespace view" of the various DSNs managed by the management devices 204 can be created. When inspecting the namespace range information, the analytics agent of the global coordinator 210 is able to identify similar characteristics across the DSNs. Examples of such similar characteristics include, but are not limited to, drive metadata (e.g., firmware version, vendor, age, etc.), workload information (e.g., number of faults, number of IDAs, etc.), concurrent DSN process errors that align with reported invalid name space ranges, general process health, and/or the like, including combinations and/or multiples thereof.

Such metadata can then be combined with the namespace range information to describe several possible causes of invalid namespace ranges. The function can be rule-based, pattern-based, machine-learning based, and/or the like, including combinations and/or multiples thereof. Possible causes of invalid ranges are identified and stored for future use. In subsequent coordination messages, the global coordinator 210 can incorporate the newly discovered possible causes into the exchange of coordination messages with the management devices 204. The management devices 204 can then extract invalid range causes from the coordination messages and inform a user, such as by email, phone call, alert, text, etc.

According to one or more embodiments, the global coordinator 210 is not restricted to accepting connections from managing devices from the same vendor. That is, the global coordinator 210 can accept connections from, and exchange coordination messages with, managing devices of various makes and configurations. According to one or more embodiments, the global coordinator 210 can, using its analytics agent as described herein, extract coordination metadata and include it in the data repository (e.g., the database 206). This data, in turn, can be used to inform existing patterns and root causes of invalid namespace ranges. For example, drive performance metadata across multiple storage devices or clouds can be correlated to further tune a machine learning model that was used to determine a particular drive as a source of invalid range in a storage system. Performance metadata could also augment existing rules.

According to one or more embodiments, with a "multi-cloud" view of metadata from storage systems (which can be either hosted on-premises or on the internet as a service), the global coordinator 210 can present its findings for public use as a service, such as through a web application. This service can be used by individuals to analyze and assess differences in performance characteristics of storage systems and allow them to identify a provider (or providers) that best suit their requirements (e.g. faster reads, higher data availability, minimal pre-mature failures, etc.).

Figure 4:
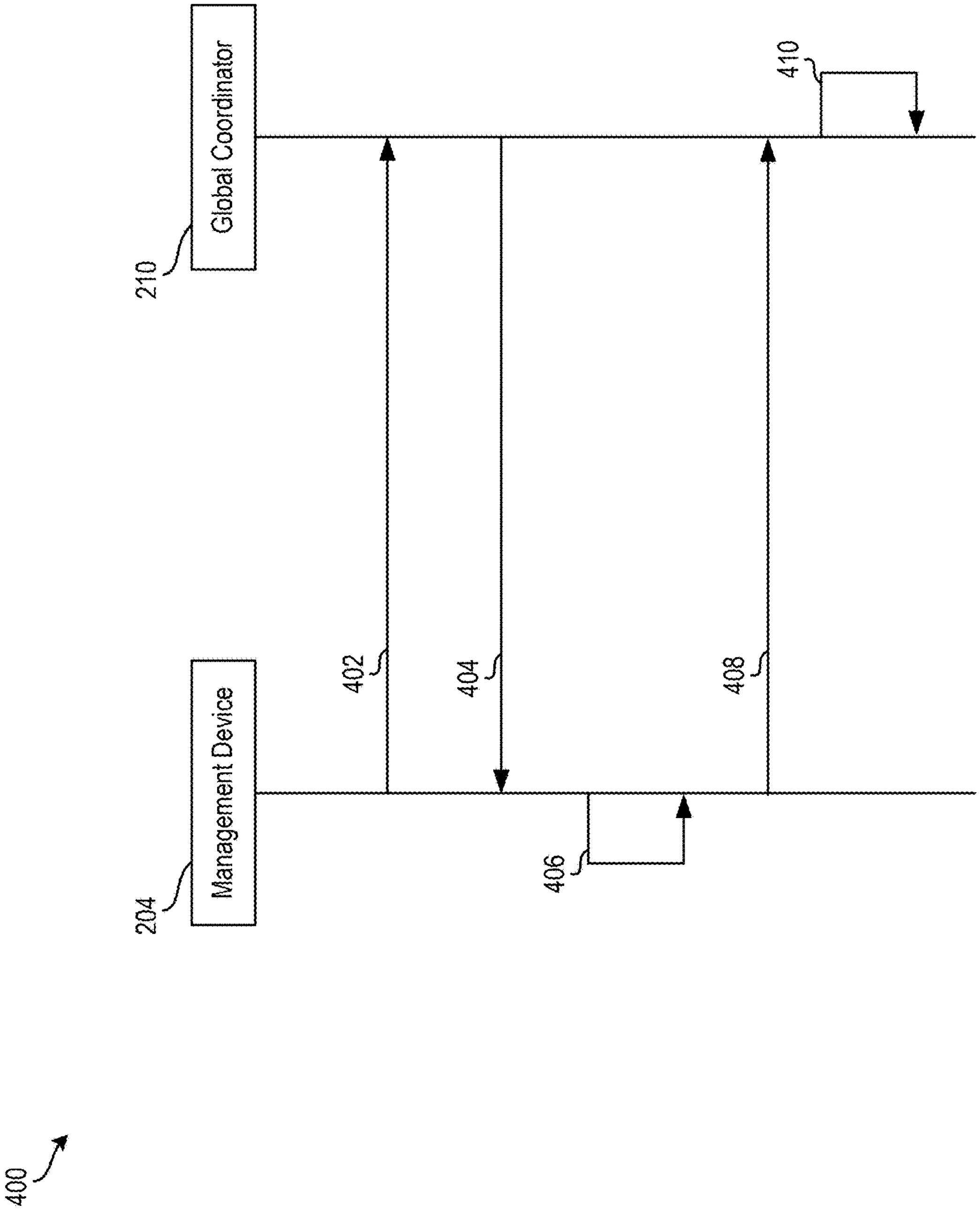
FIG. 4 schematically illustrates a sequence diagram for processing namespace range information by a global coordinator, according to an embodiment.

FIG. 4 schematically illustrates a sequence diagram 400 for processing namespace range information by a global coordinator, according to an embodiment. The sequence diagram 400 can be performed by any suitable computing system, device, or environment, such as those described herein. The sequence diagram 400 is now described with reference to the computing environment 100, and particularly the namespace gap engine 150, the storage system 200, and/or the system 300 but is not so limited. The sequence diagram shows the exchange of information, including coordination messages, between the management device 204 and the global coordinator 210.

At action 402, the management device 204 initiates a connection with and sends a coordination message to the global coordinator 210. The coordination message can include information about the management device 204 and/or the storage devices 202, for example.

At action 404, the global coordinator 210 sends to the management device 204 a coordination message in response to the message sent at action 402. This response can include invalid namespace range causes as described herein. According to one or more embodiments, the response can include one or more tasks to be completed by the management device. Examples of such tasks include, but are not limited to: do nothing, replace the affected drives, replace a system rather than the drives because it is more cost effective, and/or the like, including combinations and/or multiples thereof.

At action 406, the management device 204 processes the response from the global coordinator 210. According to one or more embodiments, the management device 204 can notify an operator (e.g., a user associated with the user device 208) of the invalid range causes. According to one or more embodiments, the management device 204 implements the task(s) assigned by the global coordinator 210 and/or causes the storage devices 202 to implement such task(s).

At action 408, the management device 204 sends result of the task(s) to the global coordinator 210 in a coordination message.

At action 410, the global coordinator 210 stores the results and makes them available to other applications, users, or systems, such as through a web application.

Figure 5:
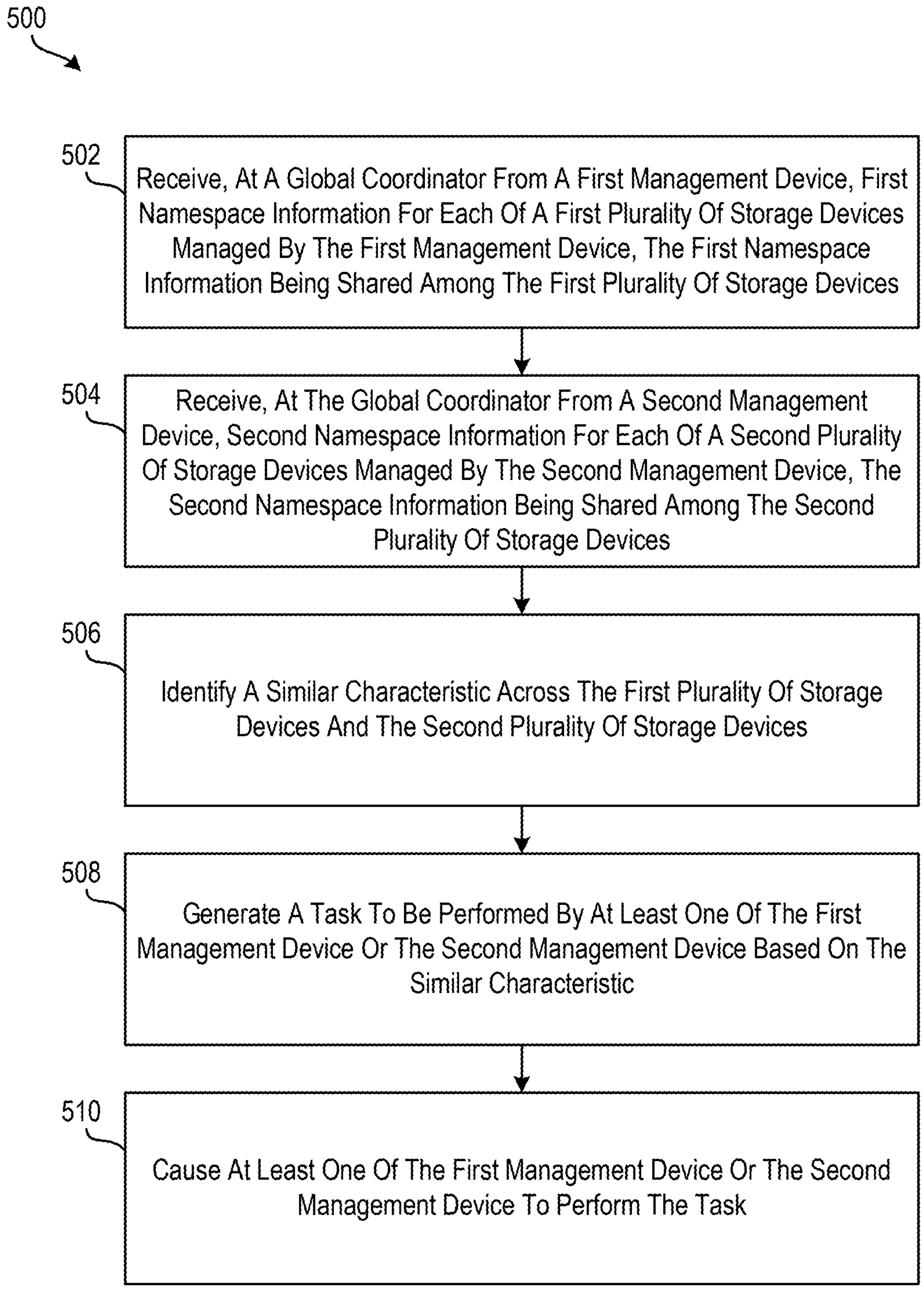
FIG. 5 illustrates a flow diagram of a method for processing namespace range information by a global coordinator, according to an embodiment.

Turning now to FIG. 5, a flow diagram of a method 500 for processing namespace range information by a global coordinator, according to an embodiment. The method 500 can be performed by any suitable computing system, device, or environment, such as those described herein. The method 500 is now described with reference to the computing environment 100, and particularly the namespace gap engine 150, the storage system 200, and/or the system 300 but is not so limited.

The method 500 begins at block 502, where the global coordinator 210 receives first namespace information from a first management device (e.g., one of the management devices 204). The first namespace information pertains to a first set of storage devices (e.g., the storage devices 202) managed by the first management device, and the namespace information is shared among these devices (e.g., among the storage devices 202).

At block 504, the global coordinator 210 receives second namespace information from a second management device (e.g., another one of the management devices 204). This information relates to a second set of storage devices managed by the second management device, with the namespace information being shared among these devices as well.

At block 506, the global coordinator 210 identifies similar characteristics across the first and second sets of storage devices. These characteristics may include drive metadata, workload information, concurrent process errors, general process health, and/or the like, including combinations and/or multiples thereof.

At block 508, based on the identified similar characteristics, the global coordinator 210 generates a task to be performed by either the first or second management device.

This task could involve actions, such as adjusting storage parameters, reallocating resources, or implementing data rebuilding.

At block 510, the global coordinator 210 causes the selected management device (e.g., the selected management device from block 508) to perform the generated task. This ensures that the storage devices are optimized and any identified issues are addressed effectively.

This method allows for efficient management of storage systems by leveraging namespace information to identify and address potential issues, thereby enhancing the performance and reliability of the storage devices.

Additional processes also may be included, and it should be understood that the processes depicted in FIG. 5 represent illustrations, and that other processes may be added or existing processes may be removed, modified, or rearranged without departing from the scope of the present disclosure. It should also be understood that the processes depicted in FIG. 5 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

One or more embodiments described herein improves the functioning of a computer or computing system (e.g., the storage system 200) by enhancing the management and optimization of storage systems through a global coordinator.

One or more embodiments provide efficient data management. The global coordinator 210 receives namespace information from multiple management devices 204, allowing the global coordinator 210 to identify similar characteristics across different storage systems. This enables more efficient data management by addressing potential issues proactively.

One or more embodiments provide task generation and execution. By generating tasks based on identified characteristics, the global coordinator 210 ensures that storage parameters are optimized. This can involve reallocating resources or implementing data rebuilding, leading to improved storage system performance.

One or more embodiments provide enhanced reliability. For example, one or more embodiments identifies and addresses invalid namespace ranges, reducing the risk of data loss and improving the reliability of storage devices.

One or more embodiments provide scalability. The ability of the global coordinator 210 to manage multiple storage systems based on namespace range information and integrate data from various sources allows for scalable solutions that can adapt to growing data needs.

One or more embodiments provide user notifications. For example, the global coordinator 210, directly or via the management device 204, provides timely notifications and actionable insights to users, enabling them to address issues promptly and maintain healthier storage systems.

One or more embodiments provide multi-cloud integration. By leveraging a multi-cloud view, the global coordinator 210 can optimize performance across different cloud platforms, offering flexibility and improved data availability.

Overall, one or more embodiments enhances the efficiency, reliability, and scalability of computing environments, such as the storage system 200, by providing a comprehensive approach to managing namespace range information and optimizing storage systems.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:

receiving, at a global coordinator from a first management device, first namespace information for each of a first plurality of storage devices of a first distributed data storage network (DSN) managed by the first management device, the first namespace information being shared among the first plurality of storage devices;

receiving, at the global coordinator from a second management device, second namespace information for each of a second plurality of storage devices of a second distributed DSN managed by the second management device, the second namespace information being shared among the second plurality of storage devices;

identifying a similar characteristic across the first plurality of storage devices and the second plurality of storage devices;

generating a global namespace view of the first distributed DSN managed by the first management device and the second distributed DSN managed by the second management device, wherein the global namespace view is based at least in part on the similar characteristic across the first distributed DSN and the second distributed DSN;

generating a task to be performed by at least one of the first management device or the second management device based on the similar characteristic; and causing at least one of the first management device or the second management device to perform the task, wherein the first namespace information and the second namespace information define a structured way to organize and manage data within the first and second distributed DSNs by assigning a unique identifier to each data element or object stored by the first and second distributed DSNs.

2. The computer-implemented method of claim 1, further comprising storing, by the global coordinator, the first namespace information and the second namespace information in a database.

3. The computer-implemented method of claim 2, wherein the database is accessible by a user associated with a user device communicatively coupled to the database.

4. The computer-implemented method of claim 1, wherein the similar characteristic comprises a plurality of similar characteristics comprising drive metadata, workload information, concurrent process errors that align with reported invalid namespace ranges, and general process health, wherein the drive metadata comprises a firmware version, a vendor, and an age, and wherein the workload information comprises a number of faults and a number of information dispersal algorithms.

5. The computer-implemented method of claim 1, further comprising combining the similar characteristic with the first namespace information and the second namespace information to describe at least one cause of an invalid namespace range.

6. The computer-implemented method of claim 5, wherein the combining is performed using at least one of a rules-based approach, a pattern-based approach, or a machine learning-based approach.

7. The computer-implemented method of claim 5, further comprising identifying and storing the at least one cause of the invalid namespace range.

8. The computer-implemented method of claim 5, further comprising transmitting the at least one cause of the invalid namespace range to at least one of the first management device and the second management device.

9. A computer program product comprising:

one or more computer-readable storage media; and program instructions stored on the one or more computer-readable storage media to perform operations comprising:

receiving, at a global coordinator from a first management device, first namespace information for each of a first plurality of storage devices of a first distributed data storage network (DSN) managed by the first management device, the first namespace information being shared among the first plurality of storage devices;

receiving, at the global coordinator from a second management device, second namespace information for each of a second plurality of storage devices of a second distributed DSN managed by the second management device, the second namespace information being shared among the second plurality of storage devices;

identifying a similar characteristic across the first plurality of storage devices and the second plurality of storage devices;

generating a global namespace view of the first distributed DSN managed by the first management device and the second distributed DSN managed by the second management device, wherein the global namespace view is based at least in part on the similar characteristic across the first distributed DSN and the second distributed DSN;

generating a task to be performed by at least one of the first management device or the second management device based on the similar characteristic; and causing at least one of the first management device or the second management device to perform the task, wherein the first namespace information and the second namespace information define a structured way to organize and manage data within the first and second distributed DSNs by assigning a unique identifier to each data element or object stored by the first and second distributed DSNs.

10. The computer program product of claim 9, further comprising storing, by the global coordinator, the first namespace information and the second namespace information in a database.

11. The computer program product of claim 10, wherein the database is accessible by a user associated with a user device communicatively coupled to the database.

12. The computer program product of claim 9, wherein the similar characteristic comprises a plurality of similar characteristics comprising drive metadata, workload information, concurrent process errors that align with reported invalid namespace ranges, and general process health, wherein the drive metadata comprises a firmware version, a vendor, and an age, and wherein the workload information comprises a number of faults and a number of information dispersal algorithms.

13. A computer system comprising:

a processor set;

one or more computer-readable storage media; and program instructions stored on the one or more computer-readable storage media to cause the processor set to perform operations comprising:

receiving, at a global coordinator from a first management device, first namespace information for each of a first plurality of storage devices of a first distributed data storage network (DSN) managed by the first management device, the first namespace information being shared among the first plurality of storage devices;

receiving, at the global coordinator from a second management device, second namespace information for each of a second plurality of storage devices of a second distributed DSN managed by the second management device, the second namespace information being shared among the second plurality of storage devices;

identifying a similar characteristic across the first plurality of storage devices and the second plurality of storage devices;

generating a global namespace view of the first distributed DSN managed by the first management device and the second distributed DSN managed by the second management device, wherein the global namespace view is based at least in part on the similar characteristic across the first distributed DSN and the second distributed DSN;

generating a task to be performed by at least one of the first management device or the second management device based on the similar characteristic; and causing at least one of the first management device or the second management device to perform the task, wherein the first namespace information and the second namespace information define a structured way to organize and manage data within the first and second distributed DSNs by assigning a unique identifier to each data element or object stored by the first and second distributed DSNs.

14. The computer system of claim 13, further comprising storing, by the global coordinator, the first namespace information and the second namespace information in a database.

15. The computer system of claim 14, wherein the database is accessible by a user associated with a user device communicatively coupled to the database.

16. The computer system of claim 13, wherein the similar characteristic comprises a plurality of similar characteristics comprising drive metadata, workload information, concurrent process errors that align with reported invalid namespace ranges, and general process health, wherein the drive metadata comprises a firmware version, a vendor, and an age, and wherein the workload information comprises a number of faults and a number of information dispersal algorithms.

17. The computer system of claim 13, further comprising combining the similar characteristic with the first namespace information and the second namespace information to describe at least one cause of an invalid namespace range.

18. The computer system of claim 17, wherein the combining is performed using at least one of a rules-based approach, a pattern-based approach, or a machine learning-based approach.

19. The computer system of claim 17, wherein the operations further comprise identifying and storing the at least one cause of the invalid namespace range.

20. The computer system of claim 17, wherein the operations further comprise transmitting the at least one cause of the invalid namespace range to at least one of the first management device and the second management device.

* * * * *